(12) United States Patent
Beloy

(10) Patent No.: US 8,205,698 B2
(45) Date of Patent: Jun. 26, 2012

(54) VEHICLES AND METHODS OF CONTROLLING INTAKE AIRFLOW

(75) Inventor: Kevin Christopher Beloy, Columbus, OH (US)

(73) Assignee: Honda Motor Company, Ltd., Tokyo (JP)

( * ) Notice: Subject to any disclaimer, the term of this patent is extended or adjusted under 35 U.S.C. 154(b) by 692 days.

(21) Appl. No.: 12/241,907

(22) Filed: Sep. 30, 2008

(65) Prior Publication Data
US 2010/0078239 A1 Apr. 1, 2010

(51) Int. Cl.
*B60K 13/02* (2006.01)
*B60K 13/06* (2006.01)
(52) U.S. Cl. ................ 180/68.3; 180/68.1; 180/68.2
(58) Field of Classification Search ............ 180/68.1, 180/68.2, 68.3, 219, 229
See application file for complete search history.

(56) References Cited

U.S. PATENT DOCUMENTS

| | | | |
|---|---|---|---|
| 4,513,699 A | 4/1985 | Cser | |
| 4,887,687 A | 12/1989 | Asai et al. | |
| 4,898,144 A | 2/1990 | Kobayashi et al. | |
| 5,056,473 A | 10/1991 | Asaki et al. | |
| 5,526,789 A | 6/1996 | Stein et al. | |
| 5,560,446 A * | 10/1996 | Onishi | 180/219 |
| 5,572,966 A | 11/1996 | Doddy et al. | |
| 6,251,151 B1 | 6/2001 | Kobayashi et al. | |
| 6,718,930 B2 | 4/2004 | Ozeki | |
| 6,892,842 B2 | 5/2005 | Bouffard et al. | |
| 6,910,546 B2 | 6/2005 | Tsutsumi et al. | |
| 6,910,716 B2 | 6/2005 | Kurayoshi et al. | |
| 7,156,066 B2 | 1/2007 | Nishizawa | |
| 7,237,522 B2 | 7/2007 | Fukami et al. | |
| 7,258,186 B2 | 8/2007 | Okabe et al. | |
| 7,270,207 B2 | 9/2007 | Idei et al. | |
| 2005/0051375 A1 * | 3/2005 | Momosaki | 180/219 |
| 2006/0230728 A1 * | 10/2006 | Tsuruta et al. | 55/385.3 |
| 2006/0283647 A1 | 12/2006 | Seki et al. | |
| 2010/0078239 A1 * | 4/2010 | Beloy | 180/68.3 |

FOREIGN PATENT DOCUMENTS

GB 1280683 7/1972

* cited by examiner

*Primary Examiner* — Hau Phan
*Assistant Examiner* — Bryan Evans
(74) *Attorney, Agent, or Firm* — Ulmer & Berne, LLP

(57) ABSTRACT

A saddle-type vehicle has an engine having an intake port, a fuel tank in fluid communication with the engine, and a heat shield. A snorkel defines a flow passage and a passage opening. The flow passage is in fluid communication with the passage opening and the intake port. The flow passage has an upstream portion that has a centerline. The heat shield at least partially defines a chamber in fluid communication with the passage opening. During operation, the engine draws air through the chamber, the passage opening, and the flow passage. The heat shield includes a reflecting wall extending at an oblique angle to the centerline. The reflecting wall is configured to reflect pressure pulses emanating from the passage opening, back through the passage opening, and toward the intake port during operation of the engine.

23 Claims, 8 Drawing Sheets

US 8,205,698 B2

VEHICLES AND METHODS OF CONTROLLING INTAKE AIRFLOW

TECHNICAL FIELD

The present invention relates to intake systems for saddle-type vehicles such as all terrain vehicles (ATV's) and motorcycles.

BACKGROUND

A conventional ATV includes an engine and a fuel tank disposed above the engine. A heat shield is disposed between the engine and the fuel tank.

SUMMARY

In accordance with one embodiment, a saddle-type vehicle comprises an engine having an intake port. A fuel tank is in fluid communication with the engine. A snorkel defines a flow passage and a passage opening. The flow passage is in fluid communication with the passage opening and the intake port of the engine. The flow passage comprises an upstream portion which is adjacent to the passage opening and which extends along a centerline. The vehicle further comprises a heat shield positioned generally above the engine. The heat shield comprises a reflecting wall and at least partially defines a chamber in fluid communication with the passage opening. The reflecting wall is spaced from the passage opening and extends at an oblique angle to the centerline of the upstream portion of the flow passage. The reflecting wall is configured to reflect pressure pulses emanating from the passage opening back through the passage opening and toward the air intake port during operation of the engine.

In accordance with another embodiment, a method is provided of controlling intake airflow for a saddle-type vehicle. The saddle-type vehicle comprises an engine with an intake port, a fuel tank, a snorkel, and a heat shield. The snorkel defines a flow passage and a passage opening. The flow passage is in fluid communication with the passage opening and the intake port of the engine. The flow passage has an upstream portion adjacent to the passage opening and extends along a centerline. The heat shield and the fuel tank cooperate to at least partially define a chamber in fluid communication with the passage opening. The method comprises forming a reflecting wall as part of the heat shield to partially define the chamber. The method further comprises positioning the reflecting wall upstream of the passage opening and at an oblique angle to the centerline of the upstream portion of the flow passage such that the reflecting wall is configured to reflect pressure pulses emanating from the passage opening back into the passage opening to facilitate increased charge to the intake port of the engine while avoiding an unacceptable level of turbulence within the chamber.

In accordance with yet another embodiment, an all terrain vehicle comprises an engine having an intake port. A fuel tank is in fluid communication with the engine. A snorkel defines a flow passage and a passage opening. The flow passage is in fluid communication with the passage opening and the intake port of the engine. The flow passage comprises an upstream portion which is adjacent to the passage opening and which extends along a centerline. The vehicle further comprises a heat shield positioned generally above the engine. The heat shield comprises a reflecting wall, a guide wall, and a rear wall. The heat shield at least partially defines a chamber in fluid communication with the passage opening. The reflecting wall is spaced from the passage opening and extends at an oblique angle to the centerline of the upstream portion of the flow passage. The guide wall is contiguous with the reflecting wall and is positioned to guide the flow of ambient air into the chamber. The tear wall cooperates with at least the reflecting wall to define an air entry passage to the chamber. The reflecting wall is configured to reflect pressure pulses emanating from the passage opening back through the passage opening and toward the air intake port during operation of the engine. The chamber is at least partly defined by the fuel tank.

In accordance with still another embodiment, a saddle-type vehicle comprises an engine comprising an intake port. A fuel tank is in fluid communication with the engine. A snorkel defines a flow passage and a passage opening. The flow passage is in fluid communication with the passage opening and the intake port of the engine. The flow passage comprises an upstream portion which is adjacent to the passage opening and which extends along a centerline. The vehicle further comprises a heat shield positioned generally above the engine. The heat shield at least partially defines a chamber in fluid communication with the passage opening. The heat shield comprises means for reflecting pressure pulses emanating from the passage opening back through the passage opening and toward the air intake port during operation of the engine to facilitate increased charge to the intake port of the engine while avoiding, an unacceptable level of turbulence within the chamber.

BRIEF INSCRIPTION OF THE DRAWINGS

While the specification concludes with claims particularly pointing out and distinctly claiming the present invention, it is believed that the same will be better understood from the following description taken in conjunction with the accompanying drawings in which:

FIG. 4A is an enlarged elevation view depicting a lip of an upstream end portion of the snorkel shown in FIG. 4;

DETAILED DESCRIPTION

Figure 1:
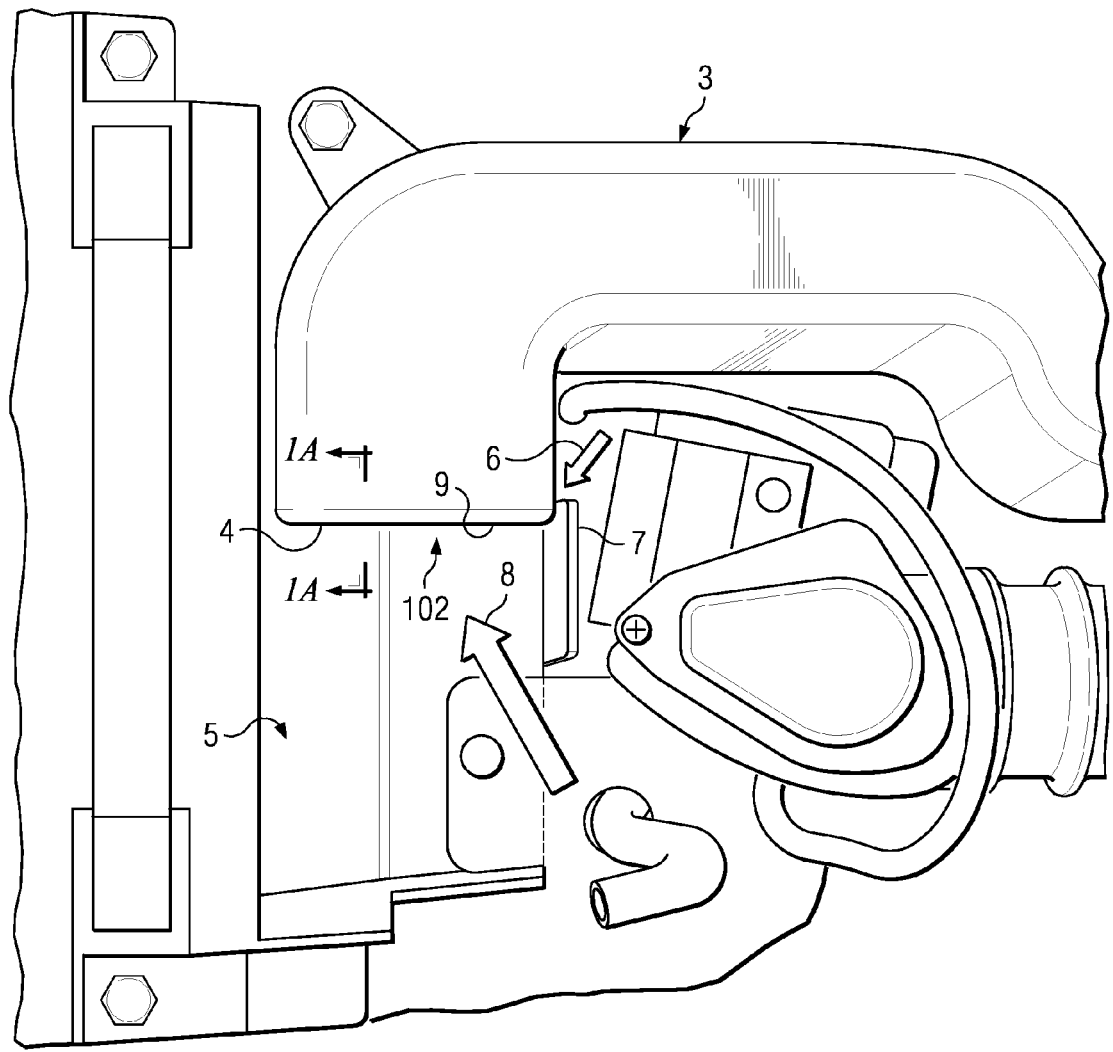
FIG. 1 is a top plan view depicting a portion of a prior art intake system.
Figure 1A:
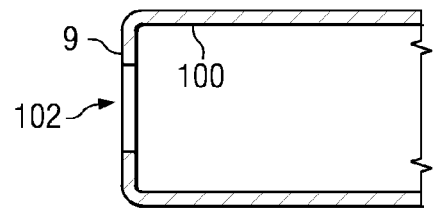
FIG. 1A is a cross-sectional view taken along line 1A-1A in FIG. 1.
Figure 2:
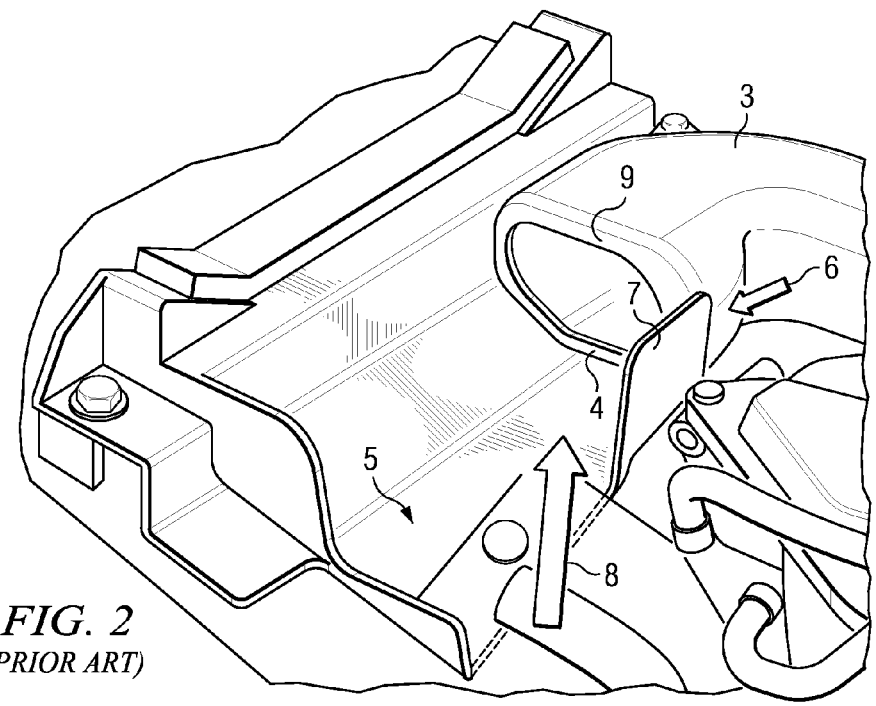
FIG. 2 is a perspective view depicting the prior art intake system of FIG. 1.

FIGS. 1, 1A and 2 show the upstream portion of a prior art intake system. This prior art system includes a snorkel 3 with an open end 4 that receives ambient air from between a heat shield 5 and the bottom of a fuel tank (not shown). Some air can be drawn into the snorkel 3 in the direction of arrow 6 (between a rear wall 7 of the heat shield 5 and an edge of the snorkel 3), and other air can enter generally as shown by the arrow 8. The snorkel 3 includes an interior surface 100 (FIG. 1A) and an upstream end that includes a generally annular lip 9 that extends inwardly from the interior surface 100. Lip 9 can reflect a portion of the pressure pulses that are generated by the opening and closing of the intake valves of an associated engine and that travel backward in snorkel 3 toward lip 9. This can result in an increase in air and fuel charging at the intake part of the associated engine for certain engine operating conditions. Lip 9 defines a passage opening 102 of a flow passage extending through snorkel 3. Pressure pulses travelling backward in snorkel 3, that are not reflected by lip 9, can discharge from passage opening 102. The cross-sectional area of the passage opening 102 is significantly smaller than the upstream cross-sectional area formed in part by heat shield 5 at the location where air flows toward snorkel 3 as shown generally by the arrow 8. As a result, passage opening 102 acts as an orifice that establishes the airflow into and through snorkel 3. As shown in FIG. 1A, lip 9 has a relatively small wall thickness. The characteristics of a simple orifice such as passage opening 102, which extends though a relatively thin wall, result in the cross-sectional area of passage opening 102 being optimal for a relatively narrow bandwidth of engine operating speeds. In addition, relatively small changes in the cross-sectional flow area of passage opening 102, such as that created by manufacturing tolerances, can result in shifting the optimal operating bandwidth, changing air and fuel charging, which can have a relatively large effect on engine performance.

Various other surfaces upstream of the open end 4 of the snorkel 3 may reflect pressure pulses in various directions and may create resonances at various engine speeds due to their different distances from the open end 4 of the snorkel 3 and thus their varying distances from the intake port of the engine. The reflections off of these surfaces are ineffective to significantly increase air and fuel charging. When this intake system is associated with an engine having a relatively large bore carburetor (not shown, and which is useful to supply sufficient air and fuel at high engine speeds), the engine can be relatively starved for fuel at low engine speeds if the throttle is opened rapidly. This may occur because rapid opening of the throttle can cause the vacuum in the intake system to drop suddenly, leaving insufficient vacuum to draw fuel through the carburetor.

Figure 3:
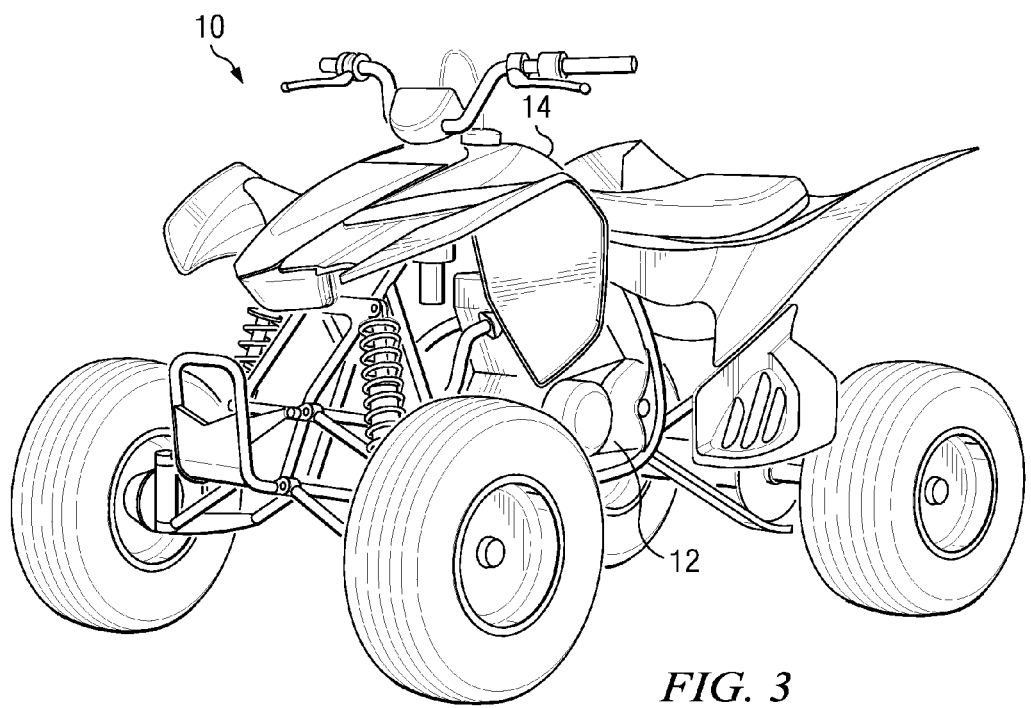
FIG. 3 is a perspective view depicting an ATV including an intake system in accordance with one embodiment.
Figure 9:
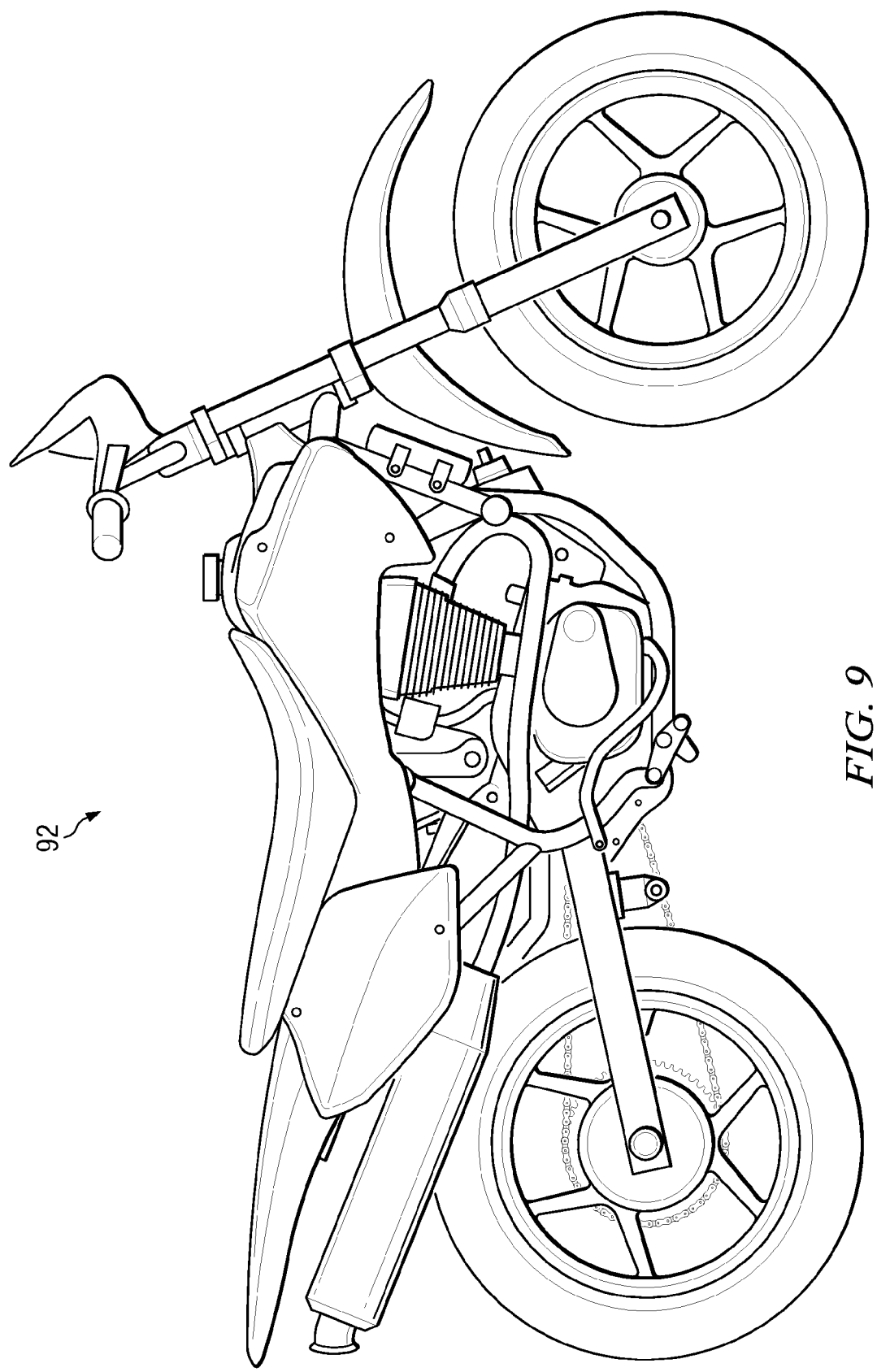
FIG. 9 is a side elevation view of a motorcycle having an intake system in accordance with another embodiment of the present invention.

An ATV 10 can include an engine 12 and a fuel tank 14, as shown in FIG. 3. An ATV is one of many varieties of saddle-type vehicles, it being understood that saddle-type vehicles also include motorcycles, scooters, personal watercraft, and other vehicles. In saddle-type vehicles such as the ATV 10, portions of the engine 12 that generate heat may be located immediately below the fuel tank 14. In order to limit heat transfer from the engine 12 to the fuel tank 14, a heat shield 16 (shown in FIG. 4 and discussed below) can be interposed between the engine 12 and the fuel tank 14. With the heat shield 16 positioned above the engine 12 and below the fuel tank 14, the heat shield 16 can block heat from directly radiating from the engine 12 to the fuel tank 14. However, it will be appreciated that heated air can, in some circumstances, flow around the heat shield 16 and reach the sides of the fuel tank 14. Though the heat shield 16 is described herein with respect to the ATV 10, it will be appreciated that a heat shield can alternatively be provided upon any of a variety of other straddle-type vehicles such as, for example a motorcycle 92 as shown in FIG. 9.

Figure 4:
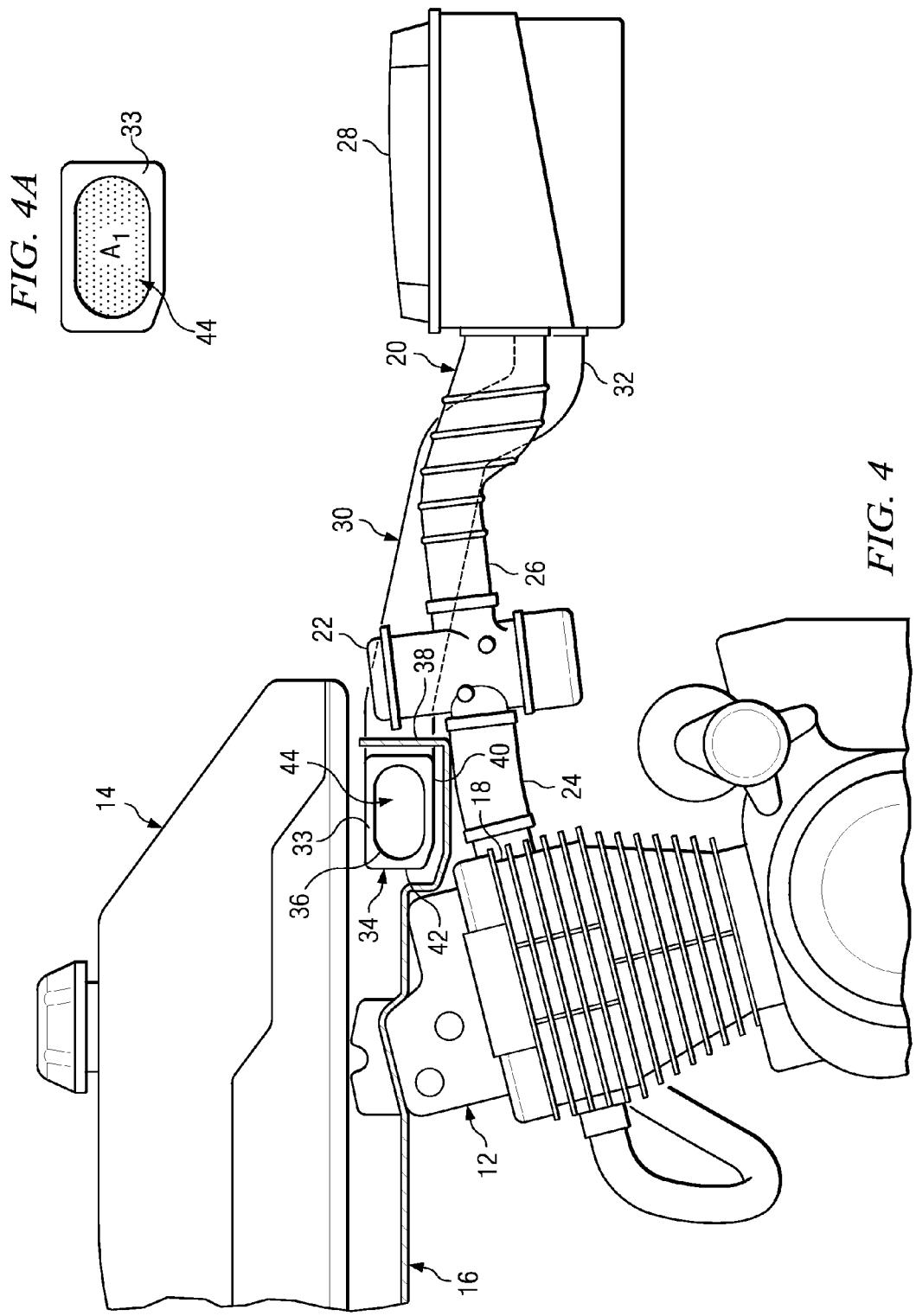
FIG. 4 is a side elevation view, partly in section, depicting a portion of the vehicle shown in FIG. 3 and showing components of an intake system forming a part of the vehicle.

The engine 12 can comprise a four stroke internal combustion engine which is configured to consume gasoline. However, in alternative embodiments, it will be appreciated that an engine can comprise any of a variety of other configurations and/or can be configured to consume any of a variety of other types of liquid, solid, and/or gaseous fuels. For example, the principles disclosed herein may be applied to two-stroke engines and diesel engines. The engine 12 is shown in FIG. 4 to include an intake port 18 for receiving air, and perhaps also fuel, for consumption, by the engine 12.

Figure 5:
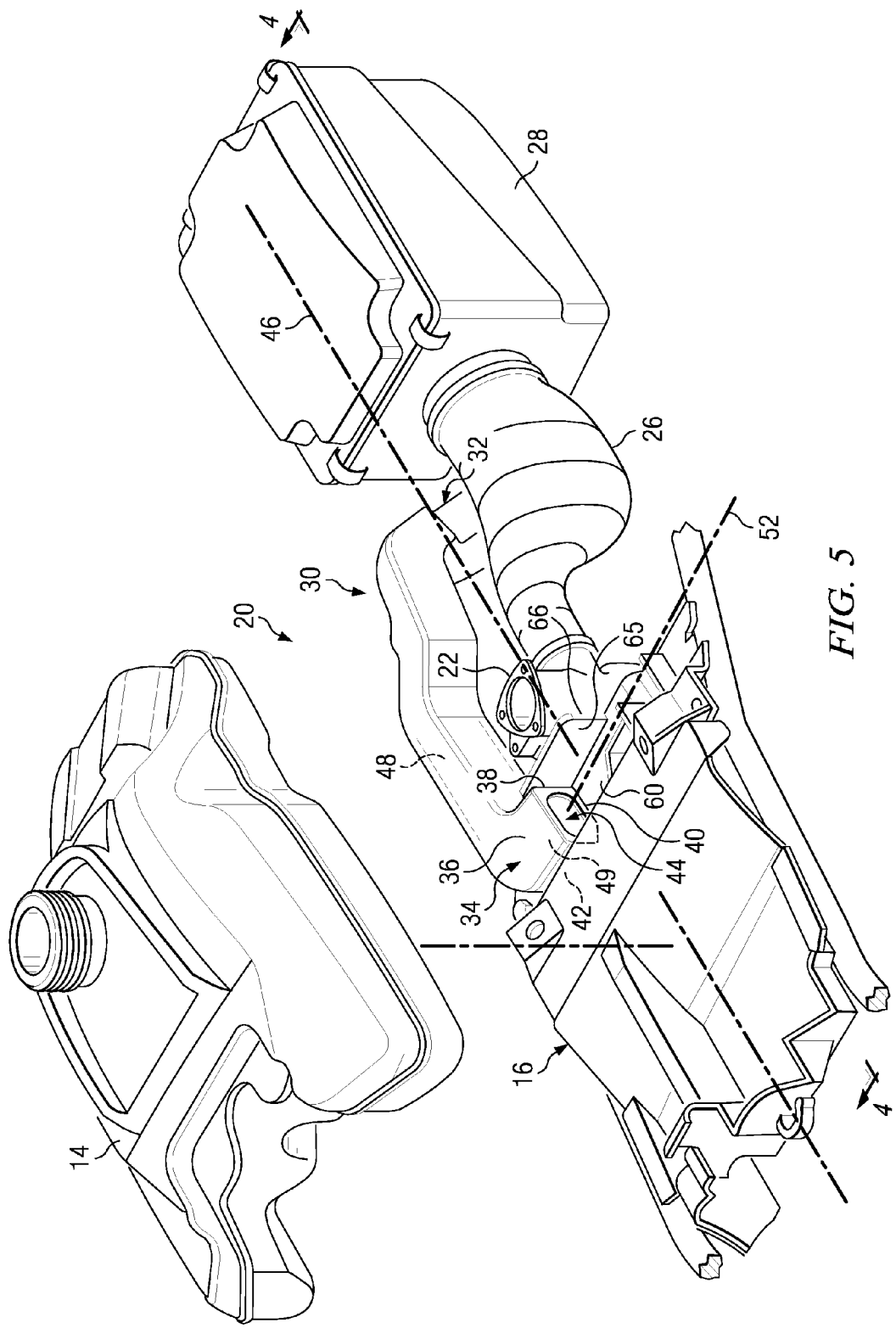
FIG. 5 is a partially exploded perspective view depicting a portion of the vehicle shown in FIG. 3 and showing components of the intake system of FIG. 4.

An intake system 20 can be attached to the intake port 18. The intake system 20 can be configured to present a charge of air (and fuel, depending on the engine configuration) to the intake port 18 for consumption by the engine 12. In one embodiment, as shown in FIGS. 4-5, the intake system 20 can include a carburetor 22 which is connected to the intake port 18 by a manifold 24. In such an embodiment, the fuel tank 14 can be in fluid communication with the engine 12 through the carburetor 22. An air duct 26 can connect an upstream side of the carburetor 22 with an air filter box 28. The air filter box 28 can include a filter element to prevent dirt and debris from being passed through the air duct 26 to the intake port 18 of the engine 12. In an alternative embodiment, it will be appreciated that an intake system might not include a carburetor, but rather a fuel injection system might be associated with an engine in a suitable manner.

The intake system 20 can also include a snorkel 30 which can be configured to capture ambient air and then direct the captured ambient air to the air filter box 28. The snorkel 30 includes an interior surface 31 and is shown to extend between a downstream end portion 32 and an upstream end portion 34. The downstream end portion 32 can be attached to the air filter box 28. The snorkel 30 defines a passage opening 44 (FIGS. 4, 5, and 7) and a flow passage 48 (FIG. 6) that is in fluid communication with the passage opening 44. The upstream end portion 34 can include walls 36, 38, 40, and 42 and can also include a generally annular lip 33 that extends inwardly from the interior surface 31 as shown in FIG. 8A. Lip 33 defines the passage opening 44, which has a cross-sectional area $A_1$, as shown in FIG. 4A. The walls 36 and 40 can comprise opposed top and bottom walls 36 and 40, respectively, and the walls 42 and 38 can comprise opposed, generally vertical, front and rear walls 42 and 38, respectively. The flow passage 48 extends from the passage opening 44 to the air filter box 28 and is in fluid communication with the intake port 18 of the engine 12. The flow passage 48 includes an upstream portion (shown generally at 49 in FIG. 5) that is adjacent to the passage opening 44 and extends along a centerline 52. The passage opening 44 can lie in a generally vertical plane that can be generally parallel with a lengthwise axis 46 of the ATV 10.

Each of the walls 36, 38, 40 and 42 of the upstream end portion 34 of the snorkel 30 can be planar and generally parallel with centerline 52, as shown in FIG. 5. The centerline 52 can extend perpendicular to, and through the center of, a plane defined by the passage opening 44. The upstream end portion 34 of the snorkel 30 can thus extend laterally of the ATV 10, and accordingly the centerline 52 can be transverse to the lengthwise axis 46 of the ATV 10, as shown in FIG. 5. The walls 36, 38, 40 and 42 of the upstream end portion 34 of the snorkel 30 can thus define an upstream portion (shown generally at 49) of the flow passage 48 that extends laterally of the ATV 10 before the snorkel 30 turns toward the filter box 28, as shown in FIG. 5. The centerline 52 of the upstream portion (shown generally at 49) of the flow passage 48 can also be the centerline of the upstream end portion 34 of the snorkel.

Figure 6:
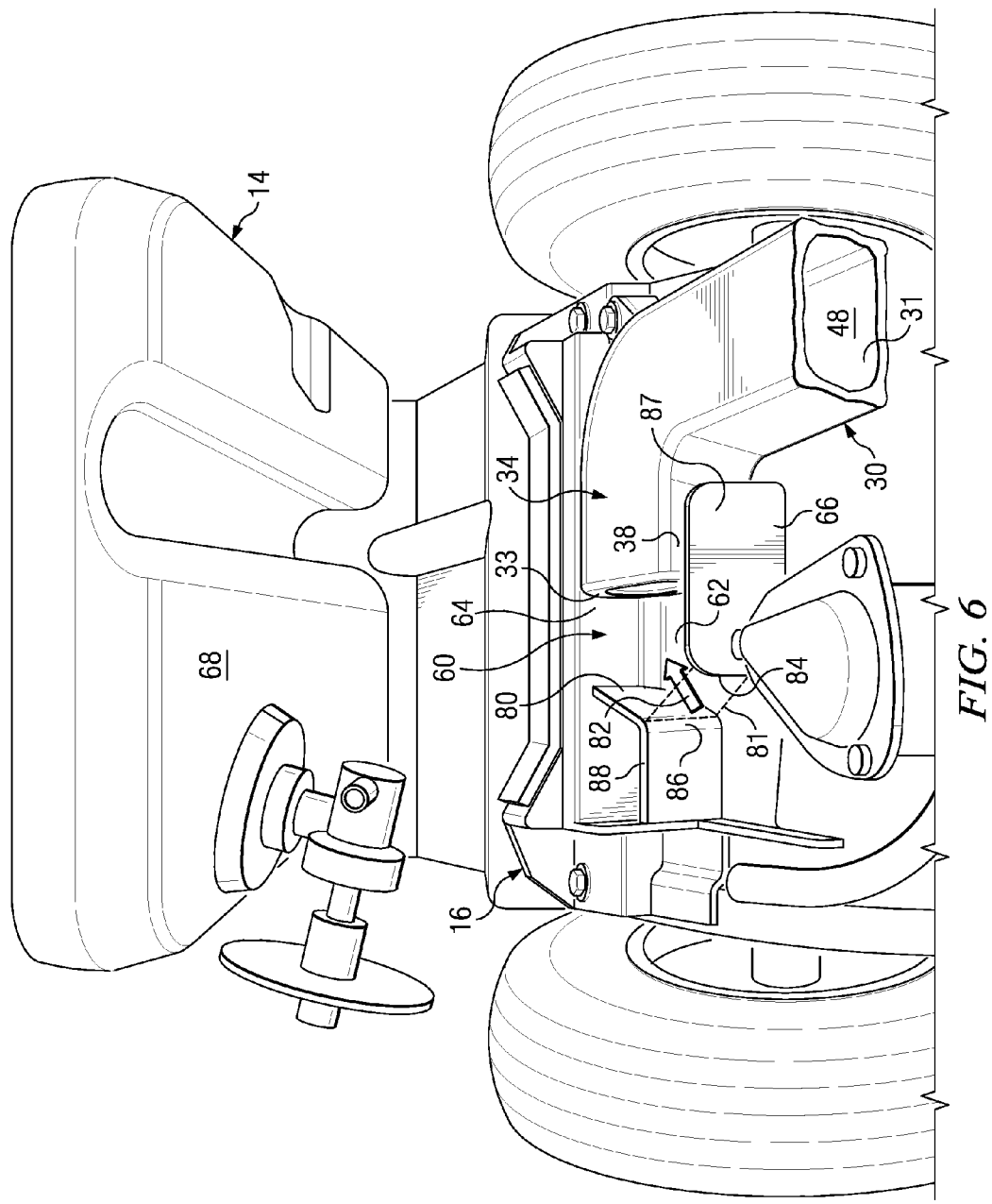
FIG. 6 is a perspective view depicting a portion of the vehicle shown in FIG. 3 and showing components of the intake system of FIGS. 4-5, wherein the fuel tank is tipped upward from its installed position.
Figure 7:
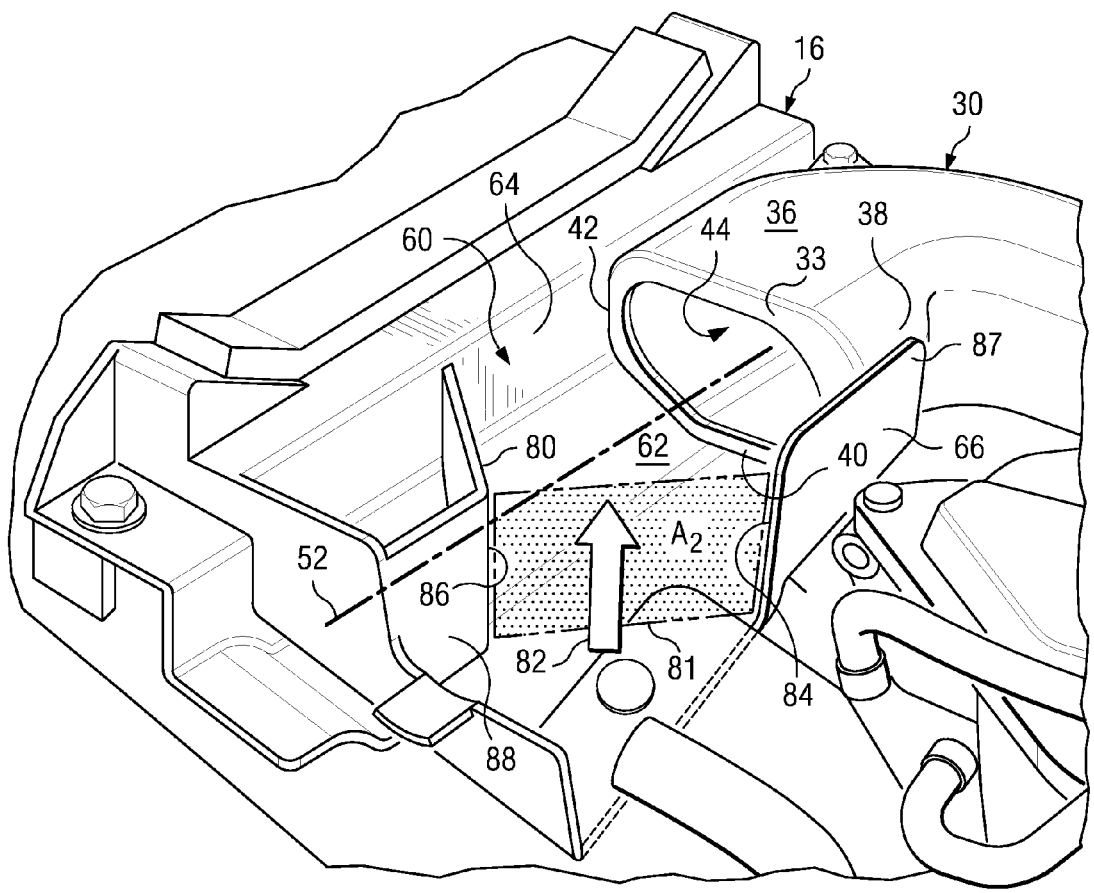
FIG. 7 is a perspective view depicting certain components of the intake system of FIGS. 4-6.

The upstream end portion 34 of the snorkel 30 can be received in a chamber 60 such that the chamber 60 is in fluid communication with the flow passage 48 of the snorkel 30. The chamber 60 can be at least partially defined by the heat shield 16 and the fuel tank 14, as described in further detail below. FIG. 6 shows the fuel tank 14 lifted up at its rear to expose the chamber 60. Variation in configuration of the chamber 60 can affect tuning of the intake system 20, and resultant operation of the engine 12. In particular, the configuration of the chamber 60 can be selected such that the intake system 20 has a resonant frequency which achieves optimum operation of the engine 12 at certain engine speeds. For example, when the engine 12 is operating at a relatively low speed, it may be desirable to establish a resonance of pulses of air pressure, i.e. periodic variations in air density, in the intake system 20 to force additional air into the intake port 18 (FIG. 4) of the engine 12 above that amount which would be drawn into the engine 12 without such resonance. The desired resonance within intake system 20 can be achieved without losing vacuum at carburetor 22 so that the desired fuel flow to engine 12 is maintained. Resonance occurs when periodic pressure variations are reflected in a manner that results in an increased air density at the intake port 18 of the engine 12 while the intake valve (not shown) of the engine 12 is open. Establishing and using intake system resonance at low engine speeds can allow the engine 12 to have valve timing of intake and exhaust valves (not shown) that is optimized for performance of the engine 12 at higher engine speeds.

At least some of the walls 36, 38, 40, and 42 of the upstream end portion 34 of the snorkel 30 can be adjacent to, and can in one embodiment be in contacting engagement with, respective adjacent portions of the heat shield 16. For example, as shown in FIG. 7, the wall 40 of the snorkel 30 can be adjacent to a bottom wall 62 of the heat shield 16, the wall 42 of the snorkel 30 can be adjacent to a front wall 64 of the heat shield 16, and the wall 38 of the snorkel 30 can be adjacent to a surface (65 in FIG. 5) of a rear or stub wall 66 of the heat shield 16. The top of the chamber 60 can be closed by a region (generally shown as 68 in FIG. 6) of the bottom of the fuel tank 14 which can be positioned adjacent to, and can engage, the wall 36 of the snorkel 30. In one embodiment, as shown in FIG. 6, the region 68 of the fuel tank 14 can be generally flat. As compared to the prior art configuration of FIG. 2, the rear or stub wall 66 of the heat shield 16 can have a greater overlap with the wall 38 of the snorkel 30. In particular, the rear or stub wall 66 can have a downstream end portion (87 in FIGS. 7-8) that can overlap substantially with the rear wall 38 of the upstream end portion of the snorkel 30. It will be appreciated that this greater overlap can help to limit the amount of air entering the chamber 60 between the wall 38 and the rear or stub wall 66 to increase the effectiveness of chamber 60.

Figure 8:
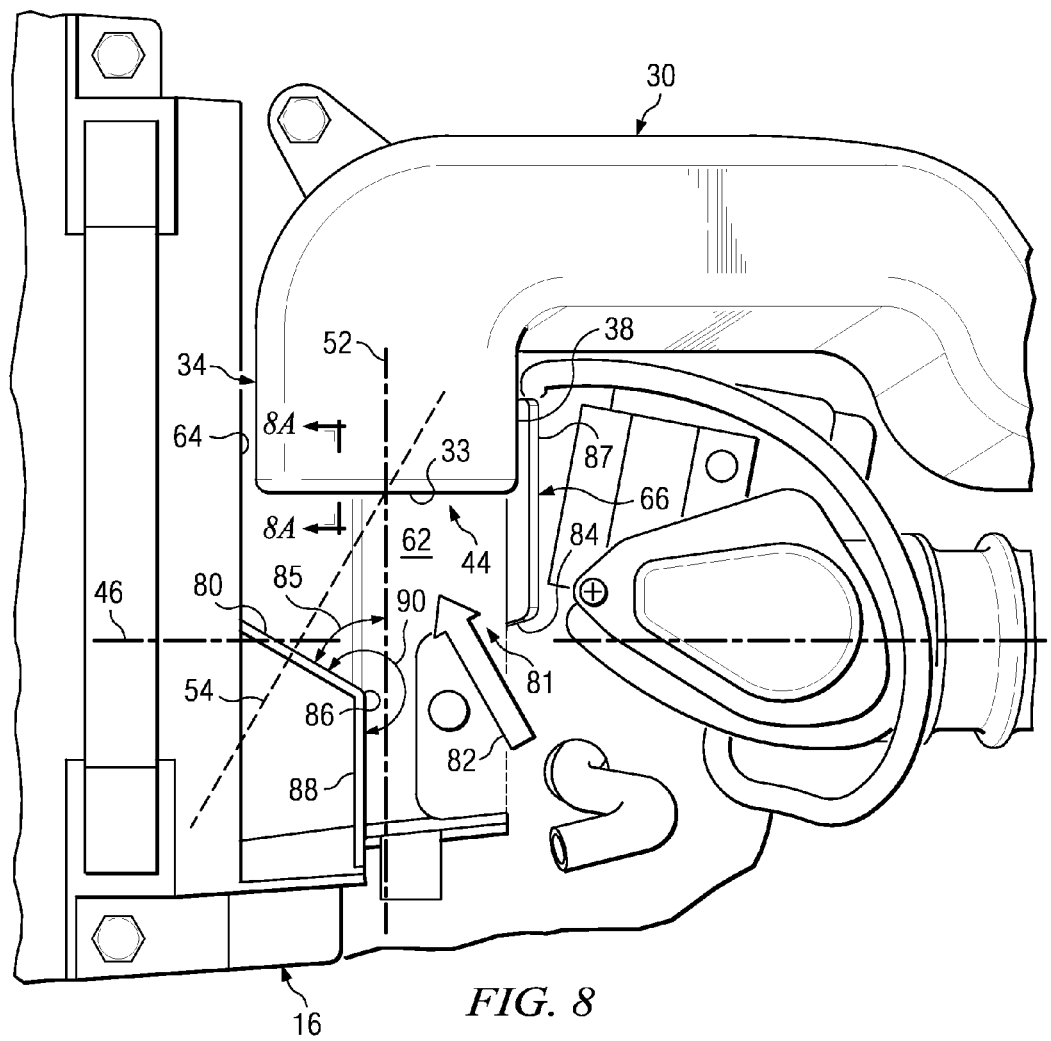
FIG. 8 is a top plan view depicting certain components of the intake system of FIGS. 4-7.
Figure 8A:
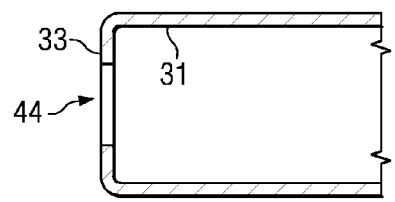
FIG. 8A is a cross-sectional view taken along line 8A-8A in FIG0.8.

The heat shield 16 can include a reflecting wall 80, as shown in FIGS. 6-8. The reflecting wall 80 can be contiguous with the front wall 64 of the heat shield 16, can be generally planar, and can lie within a vertical plane. The reflecting wall 80 can be positioned at an angle (85 in FIG. 8) to the centerline 52 of the upstream end portion of the flow passage 48. The position and orientation of the reflecting wall 80 can be selected to achieve, in cooperation with the generally annular lip 33, the desired resonance and flow properties of air within the flow passage 48. For example, positioning the reflecting wall 80 away from the passage opening 44 increases the length of the flow path to the intake port 18 of the engine 12, and accordingly can lower the natural or resonant frequency of the intake system 20 to achieve resonance at lower engine speeds. The distance between reflecting wall 80 and passage opening 44 can be selected so that the reflecting wall 80 does not obstruct airflow at high engine speeds. Thus, the passage opening 44, which is defined by the generally annular lip 33, can be sized for higher airflow at higher speeds of engine 12.

Varying the angle (85 in FIG. 8) of the reflecting wall 80 can also result in variation of resonance occurring within the intake system 20. The passage opening 44 of the snorkel 30 can act in part as a point source for the pressure pulses which can travel in a generally arcuate wavefront from the passage opening 44. In one embodiment, as shown in FIG. 8, the reflecting wall 80 can be positioned so that it is generally centered about, and perpendicular to, a line 54 which extends from the center of the passage opening 44. In one embodiment, the reflecting wall 80 can be at an oblique angle of about 55° to the centerline 52 of the upstream end portion 34 of the snorkel 30 (i.e., angle 85 can be about 55°). However, it will be appreciated that the angle 85 can have any of a variety of other suitable magnitudes. In this position, the reflecting wall 80 can reflect incident pressure pulses that originate from the passage opening 44 back toward the passage opening 44. Although the reflecting wall 80 is shown to be approximately straight, its shape can be varied to increase or decrease its effectiveness in directing waves back into the passage opening 44.

It will be appreciated that the adjacent relationship between one or more of the walls 62, 64, and 66 of the heat shield 16 and the bottom 68 of the fuel tank 14 with respective ones of the walls 40, 42, 38, and 36 of the snorkel need not result an airtight connection, or even in physical contact. Rather, the pressure pulses in die intake system 20 generated by the engine 12 can be effectively reflected by the reflecting wall 80 even if there are holes or gaps in the chamber 60, provided that the holes or gaps are relatively small compared to the wavelength of the pulses.

When the fuel tank 14 is positioned adjacent to the heat shield 16, the chamber 60 can be provided with an air entry passage indicated generally by the dashed rectangle 81 in FIGS. 6-7. The air entry passage has a cross-sectional area $A_2$ as shown in FIG. 7. Ambient air can flow through the air entry passage 81 into the chamber 60 as indicated generally by arrow 82. The air entry passage 81 can be defined by cooperation of an upstream edge 84 of the rear or stub wall 66 of the heat shield 16, an upstream end 86 of the reflecting wall 80 of the heat shield, the bottom wall 62 of the heat shield 16, and the bottom of the feel tank 14. In one embodiment, the cross-sectional area $A_2$ of air entry passage 81 can be sized to be approximately equal to the cross-sectional area $A_1$ of the passage opening 44, which can avoid the previously discussed problems associated with small variations in the passage opening 102 of the prior art snorkel 3. More particularly, the relationship between $A_2$ and $A_1$ can be selected to avoid limiting the total airflow through snorkel 30 and to avoid limiting the increased air and fuel charging caused by lip 33 to a relatively narrow bandwidth of operating speeds of engine 12, which reduces the sensitivity to small variations in the cross-sectional area $A_1$ of passage opening 44 such as that which may occur as a result of manufacturing tolerances. The air entry passage 81 can be shaped to minimize turbulence as ambient air enters the chamber 60. For example, the upstream edge 84 of the rear or stub wall 66 can have a rounded surface.

With reference to FIGS. 6-8, the heat shield 16 can also include an upstanding guide wall 88 that is contiguous with the reflecting wall 80 and is positioned to guide the flow of ambient air into the chamber 60. The guide wall 88 can extend generally parallel with the centerline 52 of the upstream end portion 34 of the snorkel 30, as shown in FIG. 7. An angle (90 in FIG. 8) between the guide wall 88 and the reflecting wall 80 can be obtuse, as shown in FIG. 8. In one embodiment, the angle 90 can be about 235°, though it will be appreciated that such an angle can have any of a variety of other suitable magnitudes. If the angle 90 between the reflecting wall 80 and the guide wall 88 is increased (e.g., to approach 270°), turbulence becomes more likely just downstream of the upstream end 86 of the reflecting wall 80 as the air is drawn through the chamber 60 and into the snorkel 30. In one embodiment, the guide wall 88 can cooperate with other portions of the heat shield 16 (e.g., the reflecting wall 80 and/or the rear or stub wall 66) to define the air entry passage 81.

By adjusting the position of the reflecting wall 80, it will be appreciated that the intake system 20 can be timed so that its natural frequency corresponds to a selected frequency or frequency range of pressure pulses generated as an intake valve within the engine 12 opens and closes. With the intake system 20 so tuned, an increased amount of air can enter the combustion chamber when the engine 12 is operating at or around a frequency to which the intake system 20 is tuned. The length of the intake system 20, like the length of a pendulum, affects its natural frequency, with increased lengths resulting in lower natural frequencies. Thus, the length of a tuned intake system affects the engine speed at which resonance occurs and therefore the engine speed at which increased air charging occurs. It will be appreciated that the heat shield 16 can facilitate this increased air charging through and while avoiding an unacceptable level of turbulence within the chamber 60. An unacceptable level of turbulence within the chamber 60 could potentially result in disadvantages such as excessive noise and/or vibration, diminished useful life of components of the intake system 20, and/or inadequate provision of air to the engine 12 thus resulting in reduced performance of the engine 12.

The heat shield 16 can provide several advantages as compared to the prior art heat shield 5 of FIGS. 1-2. For example, through use of heat shield 16 in cooperation with the generally annular lip 33 of snorkel 30, resonance can be established within the intake system 22 over a broader bandwidth of frequencies, as compared to that, which can be achieved with the prior art heat shield 5 and prior art snorkel 3, which enhances performance of the engine 12 over a broader range of speeds of engine 12. By varying the position and orientation of the reflecting wall 80, the frequency and bandwidth of resonance can be varied, and the performance of the engine 12 can accordingly be affected in a desirable manner. However, referring again to the prior art heat shield 5 of FIGS. 1-2, with the absence of any structures corresponding to the reflecting wall 80 and the guide wall 88 of the heat shield 16, the resonance imposed upon the intake system resulting from the space just upstream of the open end 4 of the snorkel 3 can vary significantly when the surrounding parts of the vehicle, such as fenders and the fuel tank, are changed from model to model. By providing the reflecting wall 80 to have a location independent of changeable components (such as fenders and/or the fuel tank), and by providing an air entry passage 81 that faces away from any such changeable components, the desired resonance of the intake system 20 can be maintained even when the surrounding components are altered, such as may occur from model year to model year of a vehicle. Furthermore, insofar as changes to aesthetic components of a vehicle result in undesirable variations in resonance in an intake system for an engine, such variations in resonance can be compensated for by adjusting the heat shield (e.g., the position and orientation of the reflecting wall 80). It will be appreciated that such adjustments to the heat shield can typically be achieved without any aesthetic consequence to the vehicle.

The foregoing description, of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A saddle-type vehicle comprising:
an engine comprising an intake port;
a fuel tank in fluid communication with the engine;
a snorkel defining a flow passage and a passage opening, the flow passage being in fluid communication with the passage opening and the intake port of the engine, and the flow passage comprising an upstream portion adjacent to the passage opening and extending along a centerline; and
a heat shield positioned generally above the engine and comprising a reflecting wall, a guide wall contiguous with the reflecting wall, and a front wall spaced from the guide wall, the heat shield and the fuel tank at least partially defining a chamber in fluid communication with the passage opening, each of the reflecting wall and the guide wall being spaced from the snorkel and upstream of the passage opening, the reflecting wall extending at an oblique angle to the centerline of the upstream portion of the flow passage; wherein
the reflecting wall is configured to reflect pressure pulses emanating from the passage opening back through the passage opening and toward the intake port during operation of the engine;
the guide wall is positioned to guide the flow of ambient air into the chamber and forms an obtuse angle with the reflecting wall; and
the guide wall is generally parallel with the centerline of the upstream portion of the flow passage.

2. The saddle-type vehicle of claim 1 wherein:
the snorkel comprises an upstream end portion; and
the upstream end portion defines the passage opening and is received within the chamber.

3. The saddle-type vehicle of claim 2 wherein the front wall of the heat shield is positioned adjacent to the upstream end portion of the snorkel, the reflecting wall being contiguous with the front wall.

4. The saddle-type vehicle of claim 3 wherein the heat shield further comprises a rear wall, the rear wall cooperating with at least one of the reflecting wall and the guide wall of the heat shield to define an air entry passage to the chamber.

5. The saddle-type vehicle of claim 4 wherein the rear wall of the heat shield comprises a downstream end portion positioned adjacent to the upstream end portion of the snorkel, and the rear wall of the heat shield further comprises an upstream rounded surface.

6. The saddle-type vehicle of claim 3 wherein the reflecting wall comprises an upstream edge and the guide wall extends upstream from the upstream edge of the reflecting wall.

7. The saddle-type vehicle of claim 3 further comprising a carburetor connected to the intake port of the engine.

8. A method of controlling intake airflow for a saddle-type vehicle, the saddle-type vehicle comprising an engine with an intake port, a fuel tank, a snorkel, and a heat shield, the snorkel defines a flow passage and a passage opening, the flow passage being in fluid communication with the passage opening and the intake port of the engine, the flow passage having an upstream portion adjacent to the passage opening and extending along a centerline, the method comprising:
forming the heat shield to include a front wall, a guide wall, and a reflecting wall contiguous with each of the front wall and the guide wall, the guide wall being spaced from the front wall;
at least partially defining a chamber with the heat shield and the fuel tank, the chamber being in fluid communication with the passage opening; and
positioning the reflecting wall and the guide wall apart from the snorkel and upstream of the passage opening and at an oblique angle to the centerline of the upstream portion of the flow passage such that the reflecting wall is configured to reflect pressure pulses emanating from the passage opening back through the chamber and into the passage opening to facilitate increased charge to the intake port of the engine while avoiding an unacceptable level of turbulence within the chamber.

9. The method of claim 8 wherein the chamber surrounds the passage opening of the snorkel and includes an air entry passage that is open to the atmosphere.

10. The method of claim 9 further comprising positioning the guide wall at an obtuse angle with respect to the reflecting wall.

11. The method of claim 10 further comprising forming the guide wall to be generally planar.

12. The method of claim 11 wherein positioning the guide wall comprises positioning the guide wall substantially parallel with the centerline of the upstream portion of the flow passage.

13. The method of claim 8 wherein positioning the reflecting wall comprises positioning the reflecting wall such that the reflecting wall is generally centered about, and perpendicular to, a line which extends from a center of the passage opening.

14. An all terrain vehicle comprising:
an engine comprising an intake port;
a fuel tank in fluid communication with the engine;
a snorkel defining a flow passage and a passage opening, the flow passage being in fluid communication with the passage opening and the intake port of the engine, and the flow passage comprising an upstream portion adjacent to the passage opening and extending along a centerline; and
a heat shield positioned generally above the engine and comprising a reflecting wall, a guide wall, a front wall and a rear wall, the heat shield at least partially defining a chamber in fluid communication with the passage opening, the reflecting wall and the guide wall each being spaced from the snorkel and upstream of the passage opening, the reflecting wall extending at an oblique angle to the centerline of the upstream portion of the flow passage, wherein:
the reflecting wall is contiguous with each of the guide wall and the front wall, the guide wall being spaced from the front wall;
the guide wall forms an obtuse angle with the reflecting wall and is positioned to guide the flow of ambient air into the chamber;
the rear wall cooperates with at least the reflecting wall to define an air entry passage to the chamber;
the reflecting wall is configured to reflect pressure pulses emanating from the passage opening back through the passage opening and toward the intake port during operation of the engine; and
the chamber is at least partly defined by the fuel tank.

15. The all terrain vehicle of claim 14 wherein the guide wall is generally parallel with the centerline of the upstream portion of the flow passage.

16. The all terrain vehicle of claim 14 wherein the snorkel comprises an upstream end portion, the rear wall of the heat shield comprises a downstream end portion positioned adjacent to the upstream end portion of the snorkel, and the rear wall of the heat shield further comprises an upstream rounded surface.

17. The all terrain vehicle of claim 14 wherein the front wall is positioned adjacent to the upstream end portion of the snorkel.

18. The all terrain vehicle of claim 14 wherein the reflecting wall comprises an upstream end and the guide wall extends upstream from the upstream end of the reflecting wall.

19. The saddle-type vehicle of claim 2 wherein:
the upstream end portion comprises an inner surface and a generally annular lip extending inwardly from the inner surface; and
the generally annular lip defines the passage opening.

20. The saddle-type vehicle of claim 19 wherein:
the fuel tank comprises a bottom and the chamber comprises a top; and
the bottom of the fuel tank closes the top of the chamber.

21. The saddle-type vehicle of claim 20 wherein the upstream end portion of the snorkel further comprises a top wall adjacent to the bottom of the fuel tank.

22. The saddle-type vehicle of claim 21 wherein:
the heat shield further comprises a bottom wall; and
the upstream end portion of the snorkel further comprises a front wall adjacent to the front wall of the heat shield and a bottom wall adjacent to the bottom wall of the heat shield.

23. The saddle-type vehicle of claim 5 wherein the upstream end portion of the snorkel comprises a rear wall and the downstream end portion of the rear wall of the heat shield overlaps substantially with the rear wall of the upstream end portion of the snorkel.

* * * * *

UNITED STATES PATENT AND TRADEMARK OFFICE
CERTIFICATE OF CORRECTION

| | | |
|---|---|---|
| PATENT NO. | : 8,205,698 B2 | Page 1 of 1 |
| APPLICATION NO. | : 12/241907 | |
| DATED | : June 26, 2012 | |
| INVENTOR(S) | : Kevin Christopher Beloy | |

It is certified that error appears in the above-identified patent and that said Letters Patent is hereby corrected as shown below:

Column 2, line 4, change "tear" to --rear--;
Column 2, line 24, delete "," after "avoiding";
Column 2, line 27, change "INSCRIPTION" to --DESCRIPTION--;
Column 2, line 59, change "FIG0.8" to --FIG.8--;
Column 4, line 13, delete "," after "consumption";
Column 6, line 33, change "die" to --the--;
Column 6, line 48, change "feel" to --fuel--;
Column 7, line 16, change "timed" to --tuned--; and
Column 8, line 4, delete "," after "description".

Signed and Sealed this
Eleventh Day of September, 2012

David J. Kappos
*Director of the United States Patent and Trademark Office*